United States Patent

Suzuki et al.

[11] Patent Number: 5,818,143
[45] Date of Patent: Oct. 6, 1998

[54] CLAW POLE TYPE SYNCHRONOUS MOTOR

[75] Inventors: Yuzuru Suzuki, Shizuoka-ken; Sakae Fujitani, Hamakita; Haruyoshi Hino, Shizuoka-ken; Naomi Inoue, Fukuroi; Hideki Sakiyama, Shizuoka-ken, all of Japan

[73] Assignee: Minebea Co., Ltd., Nagano-ken, Japan

[21] Appl. No.: 926,553

[22] Filed: Sep. 10, 1997

Related U.S. Application Data

[63] Continuation of Ser. No. 662,448, Jun. 10, 1996, abandoned.

[30] Foreign Application Priority Data

Jul. 4, 1995 [JP] Japan .................................. 7-189742

[51] Int. Cl.⁶ ............................ H02K 19/02; H02K 21/14
[52] U.S. Cl. ............................................ 310/257; 310/49 R
[58] Field of Search .................................. 310/49 R, 257, 310/186, 162, 164, 156, 263, 49 A, 187

[56] References Cited

U.S. PATENT DOCUMENTS

| | | | |
|---|---|---|---|
| 2,901,645 | 8/1959 | Sulger | 310/166 |
| 3,310,696 | 3/1967 | Jullien-Davin | 310/164 |
| 3,414,751 | 12/1968 | Bossard | 310/164 |
| 3,475,630 | 10/1969 | Heinzen et al. | 310/43 |
| 4,059,780 | 11/1977 | Masuir | 310/164 |
| 4,381,465 | 4/1983 | Renkl et al. | 310/49 R |
| 4,656,381 | 4/1987 | Komatsu | 310/257 |
| 4,794,292 | 12/1988 | Torisawa | 310/257 |

FOREIGN PATENT DOCUMENTS

| | | | |
|---|---|---|---|
| 0043068 | 1/1982 | European Pat. Off. | H02K 37/00 |
| 1638337 | 6/1967 | Germany | H02K 21/16 |
| 2113925 | 3/1971 | Germany | H02K 21/16 |
| 3-265457 | 11/1991 | Japan | 310/49 R |

OTHER PUBLICATIONS

T. Kenjo; "Stepping Motors and Their Microprocessor Controls"; 1984; pp. 40–45; Monographs in Electrical and Electronic Engineering 16; Oxford Science Publications.

Primary Examiner—Thomas M. Dougherty
Assistant Examiner—B. Mullins
Attorney, Agent, or Firm—Frishauf, Holtz, Goodman, Langer & Chick

[57] ABSTRACT

A claw pole type synchronous motor has input frequency increasing portions in a form of notches or holes formed in portions of claw poles which have the lowest magnetic flux densities so that the motor operates in a range from a low frequency to a high frequency without lowering torques too much.

7 Claims, 6 Drawing Sheets

CLAW POLE TYPE SYNCHRONOUS MOTOR

This application is a Continuation of application Ser. No. 08/662,448, filed Jun. 10, 1996 now abandoned.

BACKGROUND OF THE INVENTION

1. Field of the Invention

The present invention relates a claw pole type synchronous motor and more particularly to a claw pole type synchronous motor used over a wide range of frequencies.

2. Description of the Related Art

A claw pole type synchronous motor including a PM two-phase stepping motor has a structure which can be manufactured at a low cost. A typical conventional claw pole type synchronous motor is disclosed in Takashi Kenjo: "Stepping motors and their microprocessor controls", Oxford University Press, 1986 (reprint), pages 40 to 43.

The conventional claw pole type synchronous motor was first designed to perform stepping operations at a low frequency. As equipment such as office automation equipment which is operated in a range from a low frequency to a high frequency has been developed recently, the motor has been also required to operate in such a wide frequency range.

In the conventional claw pole type synchronous motor, each claw pole has a large area in order to increase torque. Thus, the motor can operate only in a low frequency range. Although it is possible to make the motor operate in a high frequency range by reducing the area of each claw pole, large torque cannot be obtained by the motor. In any way, the conventional claw pole type synchronous motor cannot operate without lowering the torque too much in a range from a lower frequency and to a high frequency.

SUMMARY OF THE INVENTION

An object of the present invention is to provide a claw pole type synchronous motor which operates without lowering torque too much in a range from a low frequency to a high frequency, i.e., in a range from a low speed to a high speed.

In order to achieve the object of the present invention, a claw pole type synchronous motor comprises (1) a shaft;

(2) a rotor coaxially fixed to the shaft and comprising a multi-pole magnetized permanent magnet;

(3) two stator assemblies arranged back-to-back and coaxially provided with the rotor, each of the stator assemblies comprising (a) two stators spaced from each other at an axial distance of the shaft and each having an annular edge opposed to the shaft, and (b) a plurality of claw poles formed on the edge of each of the stators at equal circumferential intervals of each of the stators, the claw poles on each one of the stators extending toward the other one of the stators and arranged alternately with the claw poles on the other one of the stators;

(4) coils provided coaxially with the rotor in the stator assemblies and applied with an input-current frequency signal having and input-current frequency; and (5) input-current frequency range increasing means formed in a form of at least one space in a portion of each of the claw poles which has the lowest magnetic flux density, for increasing a frequency range of the input-current frequency signal.

The input-current frequency range increasing means improves the input-current frequency—pull-in torque characteristic and allows the motor to operate without reducing torque too much in a range from a low frequency to a high frequency.

It is preferred that the input-current frequency range increasing means be provided in the portions of the claw poles in which the magnetic flux density is the lowest. With this structure, the torque on the claw poles is not reduced too much, and thus the motor operates at high torque.

In consequence, provision of the input-current frequency range increasing means in the portions of the claw poles where the magnetic flux density is the lowest allows the claw pole type synchronous motor according to the present invention to operate in a range from a low frequency to a high frequency with less reduction of torque than that of the conventional claw pole type synchronous motor. In other words, the synchronous motor according to the present invention operates at high torque in a wide range from a low frequency to a high frequency.

DETAILED DESCRIPTION OF THE PREFERRED EMBODIMENTS

Figure 1:
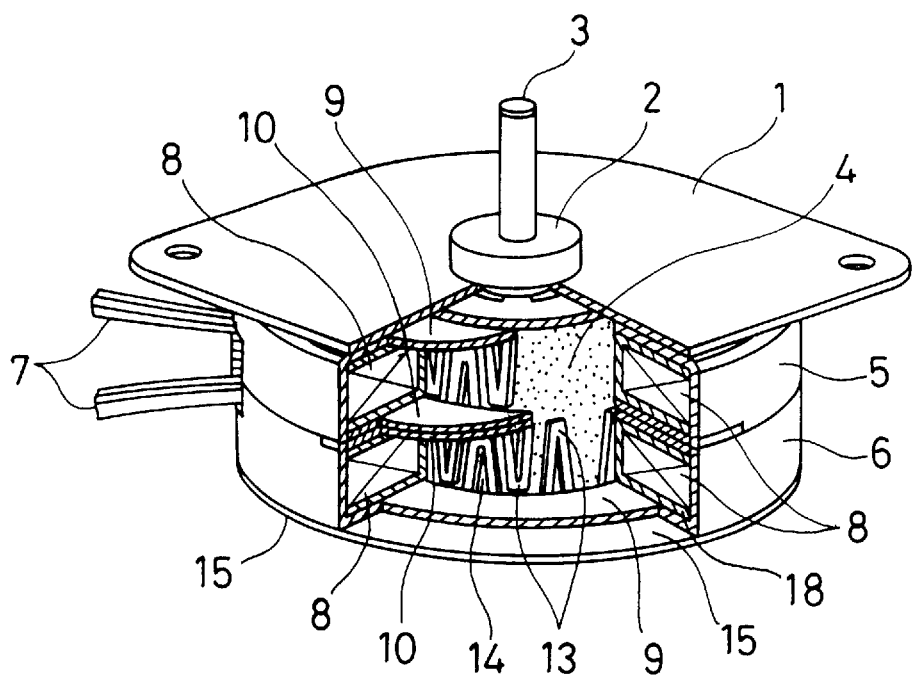
FIG. 1 is a partially broken perspective view of a first embodiment of a claw pole type synchronous motor according to the present invention.

The present invention will be described in detail by way of the preferred embodiments with reference to the accompanying drawings.

A first embodiment of a claw pole type synchronous motor according to the present invention will be described with reference to FIGS. 1 to 5.

As shown in FIGS. 1 to 4, the motor according to the first embodiment is of an inner rotor type and has a pair flanges 1 and 15 spaced from each other and a shaft 3 rotatably mounted in the central portions of the flanges 1 and 15 through bearings 2 and 16. A cylindrical rotor 4 comprises a multi-pole magnetized permanent magnet and is fixed to the shaft 3 through a cylindrical sleeve 17.

Two stator assemblies 5 and 6 each comprising two stators 9 and 10 are arranged back-to-back and provided so as to surround the rotor 4 coaxially. The stator assembly 5 constitutes an A-phase stator assembly and the stator assembly 6 constitutes a B stator assembly. A coil 8 is wound in a bobbin 18 in each stator assembly. Lead-off wires 7 are drawn out of the coils 8.

Figure 2:
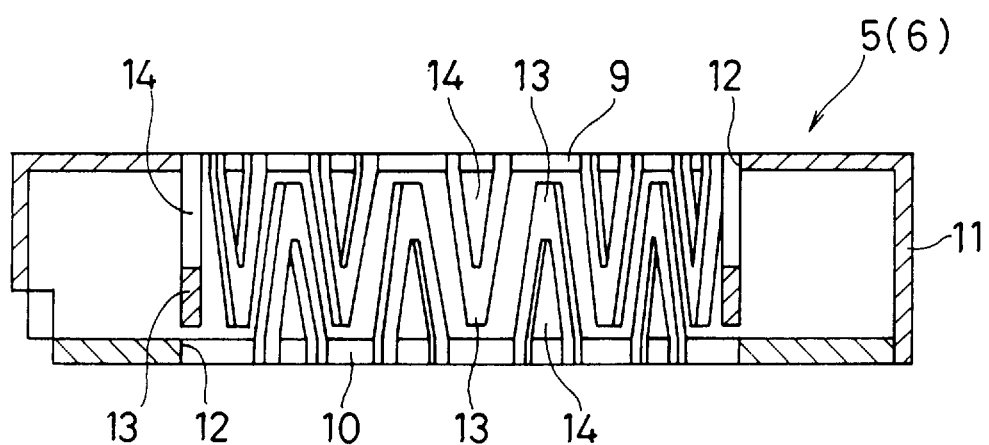
FIG. 2 is a longitudinal cross-sectional view of the stator assembly of the motor as shown in FIG. 1.
Figure 3:
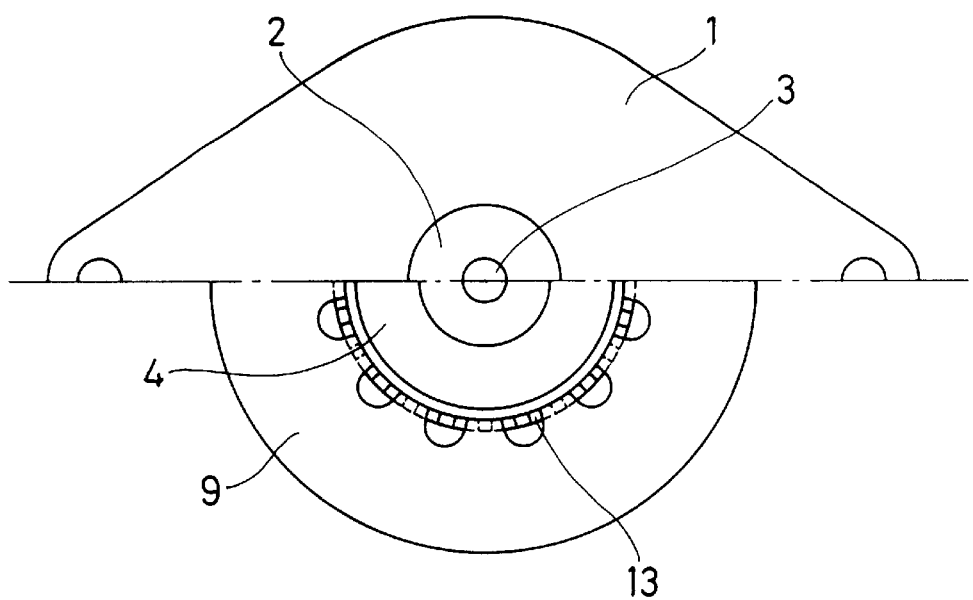
FIG. 3 shows a plan view of the motor itself in FIG. 1 at the upper half thereof and a plan view of the motor with its flange removed at the lower half thereof.

As shown in FIG. 2, each of the stator assemblies 5 and 6 comprises a pair of stators 9 and 10 arranged in parallel to each other. One of the stators which is indicated at 9 in FIG. 2 is provided on the outer edge thereof with a cylindrical side wall 11.

Figure 4:
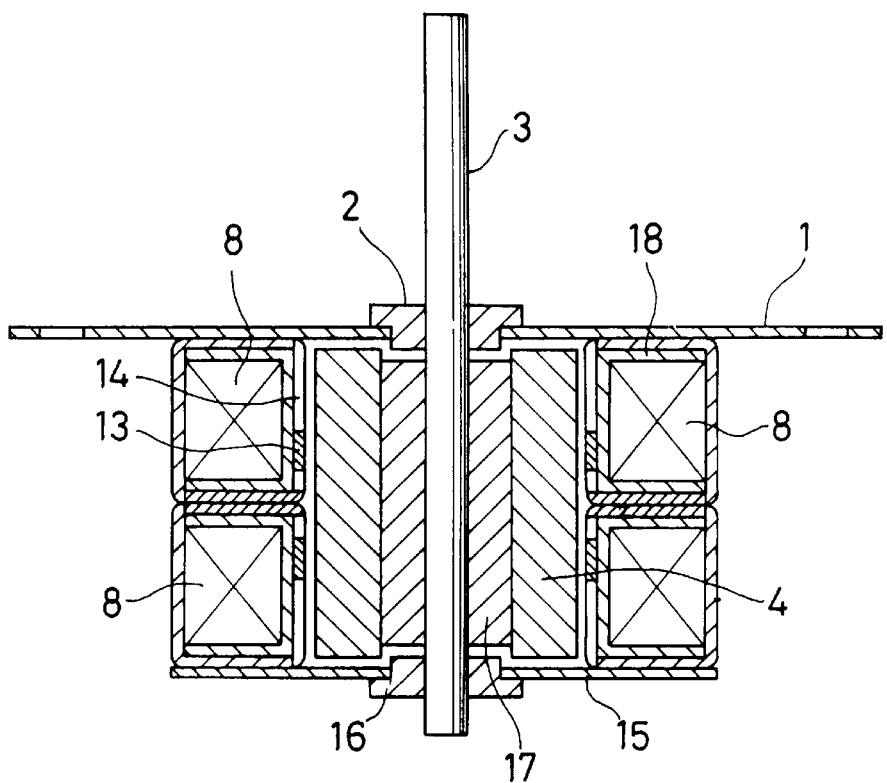
FIG. 4 is a longitudinal cross-sectional view of the motor as shown in FIG. 1.

A plurality of (two in FIG. 6) substantially isosceles triangular claw poles 13 are formed on the inner peripheral edge 12 of each of the stators 9 and 10 spaced circumferentially at equal intervals. Each claw pole 13 has its base on the circular peripheral edge 12 of the corresponding stator and extends toward the inner peripheral edge 12 of the other stator. In a state in which both stator assemblies 5 and 6 are assembled together as shown in FIG. 4, the claw poles 13 of one of the stators 9 and the claw poles 13 of the other stator 10 are alternately arranged at equal circumferential intervals so as to surround the rotor 4.

Figure 10:
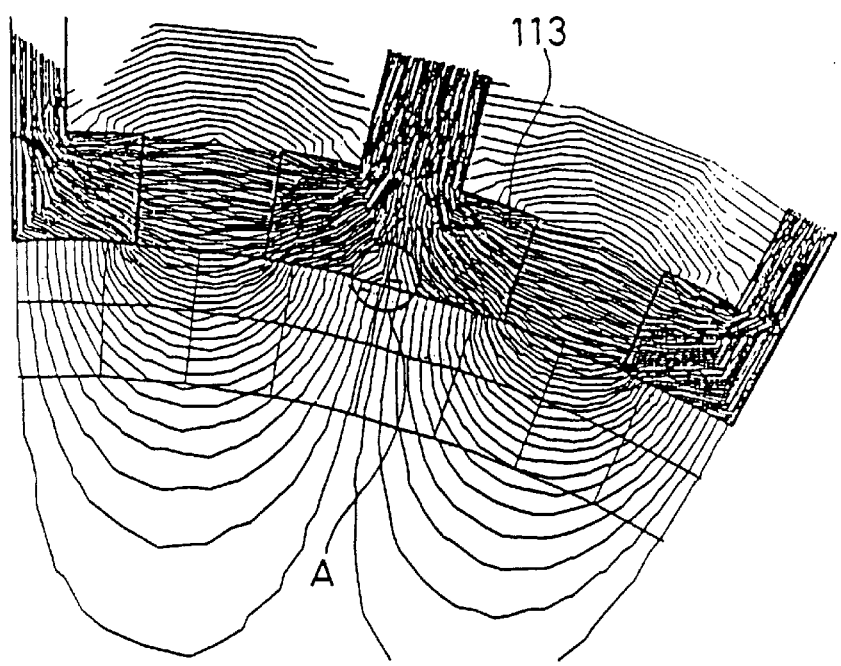
FIG. 10 is a diagram showing a magnetic flux density distribution on a cross section of a claw pole of the conventional claw pole type synchronous motor.

In FIG. 10 is shown a magnetic flux density distribution of the central portion of a claw pole 113 of a conventional claw pole type stepping motor. It can be seen that the magnetic flux density of the central portion of the claw pole 113 in a circle A is much lower than the other portions of the claw pole 113, i.e., the lowest.

Thus, the magnetic flux of this central portion little contributes to torque generation. Even if, therefore, the central portion is not used, the total torque is little reduced. When the claw pole 13 has a substantially isosceles triangular shape, the portion of the claw pole 13 providing the lowest magnetic flux density becomes narrower and narrower as it approaches the apex of the substantially isosceles triangular claw pole 13.

Figure 5:
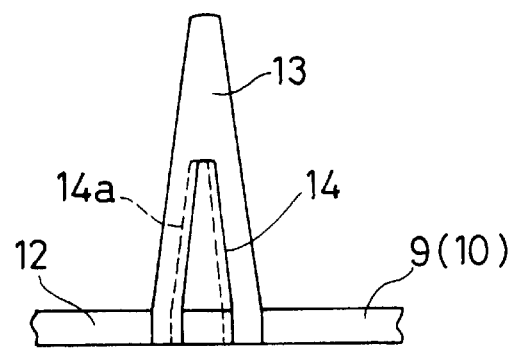
FIG. 5 is a front view of a claw pole similar to that of FIG. 1 and having therein one embodiment of input-current frequency range increasing means formed.

Keeping this phenomenon in mind, a substantially isosceles triangular notch 14 is formed, as shown in FIG. 5, in the central portion of each claw pole 13 of the first embodiment of the present invention, which portion has the lowest magnetic flux density. This arrangement reduces the area of the claw pole 13 without reducing torque too much and allows the motor to operate not only in a range from a low frequency to a high frequency but also in a high torque range of the motor.

The notch 14 may have a similar shape to the shape of the claw pole 13 so as to accord with the distribution of the magnetic flux density. Here, the notch 14 constitutes input-current frequency range increasing means, i.e., an input-current frequency range increasing portion.

Figure 11:
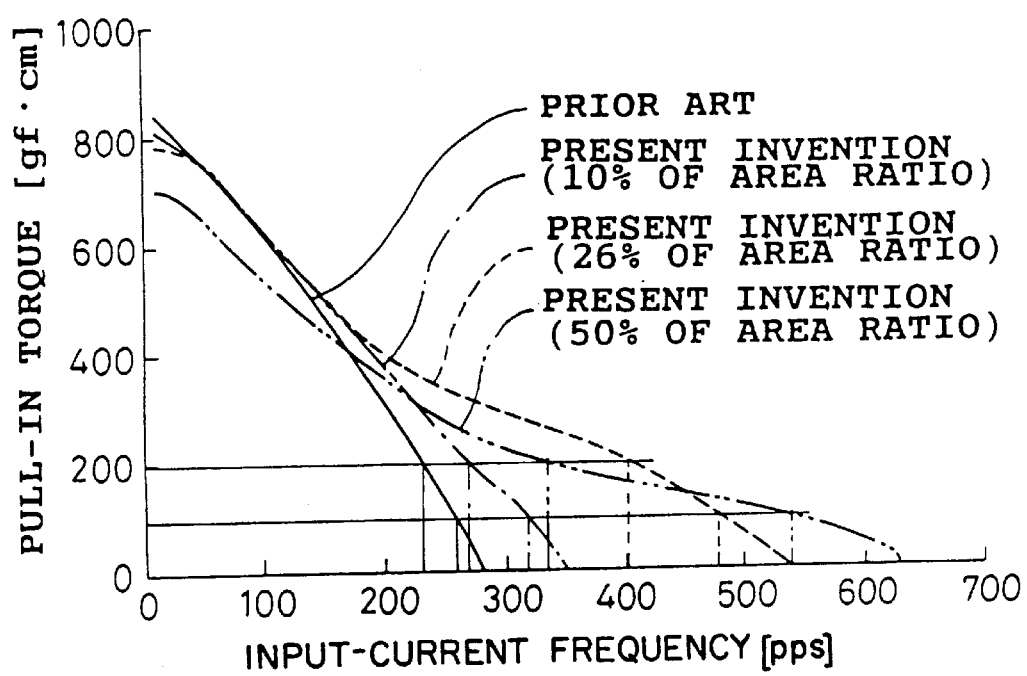
FIG. 11 is a diagram showing a pull-in torque—input-current frequency characteristic of the motor as shown in FIG. 1.

In FIG. 11 is shown a comparative chart of the input-current frequency range increasing means—pull-in torque characteristics of the first embodiment of the present invention and the prior art. As seen from this figure, the pull-in torque becomes zero at the input-current frequency of 280 pps or so like in the prior art.

When, however, the area ratio of the input-current frequency range increasing means 14 to each claw pole 13 is 26% (approximately ¼) (the area of the input-current frequency range increasing means to each claw pole being hereinafter referred to as the "area ratio"), the pull-in torque becomes zero at the input-current frequency of 550 pps at which the pull-in torque is zero (hereinafter referred to as the "zero-torque input-current frequency). Thus, the zero torque input-current frequency of the first embodiment of the present invention in this case is approximately twice as large as that of the prior art.

For the area ratio of 10% in the first embodiment of the present invention, the zero-torque input-current frequency is 350 pps, which is larger by approximately 25% than that of the prior art.

Further, for the area ratio of 50% in the first embodiment of the present invention, the zero-torque input-current frequency is 630 pps, which is approximately 2.2 times as large as that of the prior art.

Thus, the synchronous motor of the first embodiment of the present invention operates without reducing the torque too much in a range of higher frequencies than the operating frequencies of the prior art.

For example, at the pull-in torque of 200 gf·cm, the input-current frequencies of the invented motors increase from 230 pps of the prior art to 280 pps, 400 pps and 330 pps for the area ratios of 10%, 26% and 50%, respectively. At the pull-in torque of 100 gf·cm, the input-current frequencies of the invented motor increase from 260 pps of the prior art to 320 pps, 480 pps and 540 pps for the area ratios of 10%, 26% and 50%, respectively. Provision of the input-current frequency range increasing means 13 allows the noise produced during the operation of the synchronous motor of the first embodiment of the present invention to be reduced.

As shown by broken lines in FIG. 5, input-current frequency range increasing means, i.e., an input-current frequency range increasing portion can be formed by being displaced laterally in each claw pole 13 as designated at 14a.

The modified input-current frequency range increasing means 14a has the same technical effect as that of the input-current frequency range increasing means 14 as shown in FIGS. 1 to 4.

Figure 6:
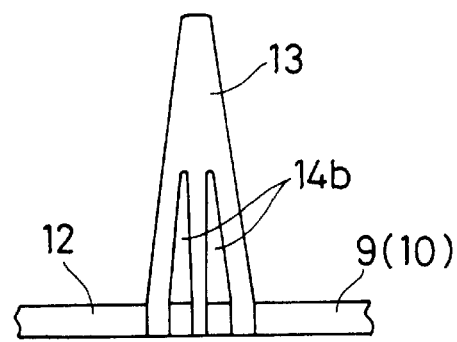
FIG. 6 is a front view of a claw pole similar to that of FIG. 1 and having therein a modification of the input-current frequency range increasing means as shown in FIG. 5.

In FIG. 6 is shown one type of input-current frequency range increasing means or input-current frequency range increasing portions, each of which is modified from that of FIG. 5 and comprises two substantially isosceles triangular notches 14b formed in the portion of the claw pole 13 which has the lowest magnetic flux density.

Notches 14b are arranged symmetrical with respect to the center line 13a of the claw pole 13. As long as they are formed in the portion of the claw pole 13 which has the lowest magnetic flux density, the central portion thereof between the notches 14b can be remained.

Figure 7:
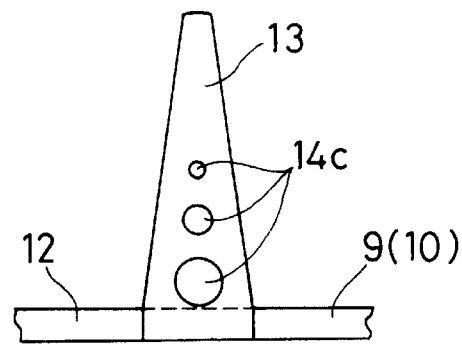
FIG. 7 is a front view of a claw pole similar to that of FIG. 1 and having therein a further modification of the input-current frequency range increasing means as shown in FIG. 5.

Illustrated in FIG. 7 is another type of input-current frequency range increasing means modified from that of FIG. 5 and comprises at least one hole 14c (an input-current frequency range increasing portion) formed on the center line 13a of the portion of each claw pole 13 at which the magnetic flux density is the lowest.

When two or more frequency increasing holes (input-current frequency range increasing portions) 14c are provided, the diameters of the holes 14c can preferably be gradually reduced as they approach the apex of the claw pole 13 so that the width of the claw pole 13 becomes smaller and smaller as it approaches the apex of the claw pole 13.

Figure 8:
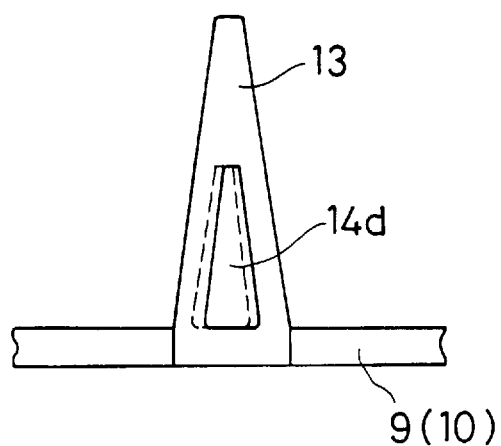
FIG. 8 is a front view of a claw pole similar to that of FIG. 1 and having a still further modification of the input-current frequency range increasing means formed as shown in FIG. 5.
Figure 9:
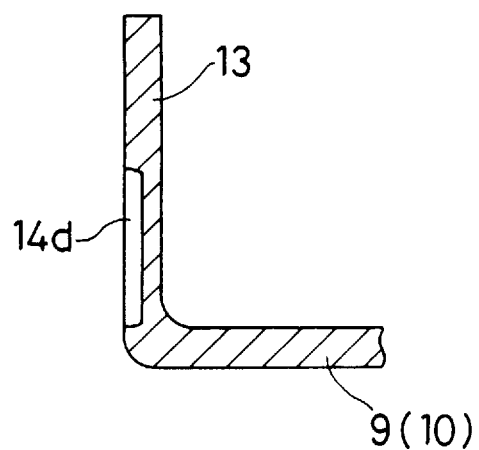
FIG. 9 is a longitudinal cross-sectional view of the claw pole of FIG. 8.

In FIGS. 8 and 9 is shown a further type of input-current frequency range increasing means (input-current frequency range increasing portions) modified from that of FIG. 5. It comprises a substantially isosceles triangular depression 14d formed in each claw pole 13. As long as the depression 14d is in a portion of the claw pole 13 which has the lowest magnetic flux density, it may be formed on the center line 13a of the claw pole 13 as shown by solid lines or may be displaced laterally as shown by broken lines. It is formed so as to open toward the rotor 4.

The input-current frequency range increasing means may have any other shape as long as it is suitable as input-current frequency range increasing means.

In FIGS. 5 to 9 are shown the substantially triangular claw poles 13. However, they may be rectangular. In a rectangular claw pole 13, input-current frequency range increasing means or input frequency increasing portions may comprise grooves having the same width and arranged parallel with each other, or a hole or a plurality of holes having the same diameter and arranged from the top to the bottom of the claw pole 13.

The input-current frequency range increasing means may be formed on the center line 13a of the claw pole 13 or suitably displaced laterally therefrom. In this case, the input-current frequency range increasing means may have any other suitable shape.

In consideration of the magnetic flux distribution and the mechanical strength of the claw pole 13, it is preferred that the area of the input-current frequency range increasing means in each claw pole 13 be ¹⁄₁₀ (10%) to ½ (50%) of each claw pole 13.

Figure 12:
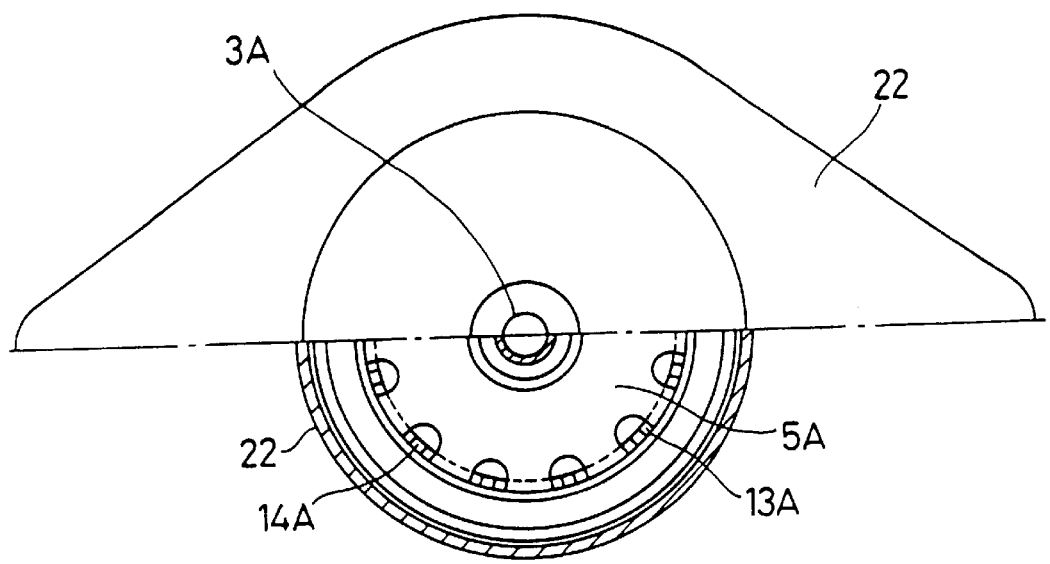
FIG. 12 shows a second embodiment of a claw pole type synchronous motor according to the present invention, with the upper half portion showing a plan view and the lower half portion showing a cross-sectional view along line XII—XII in FIG. 13.
Figure 13:
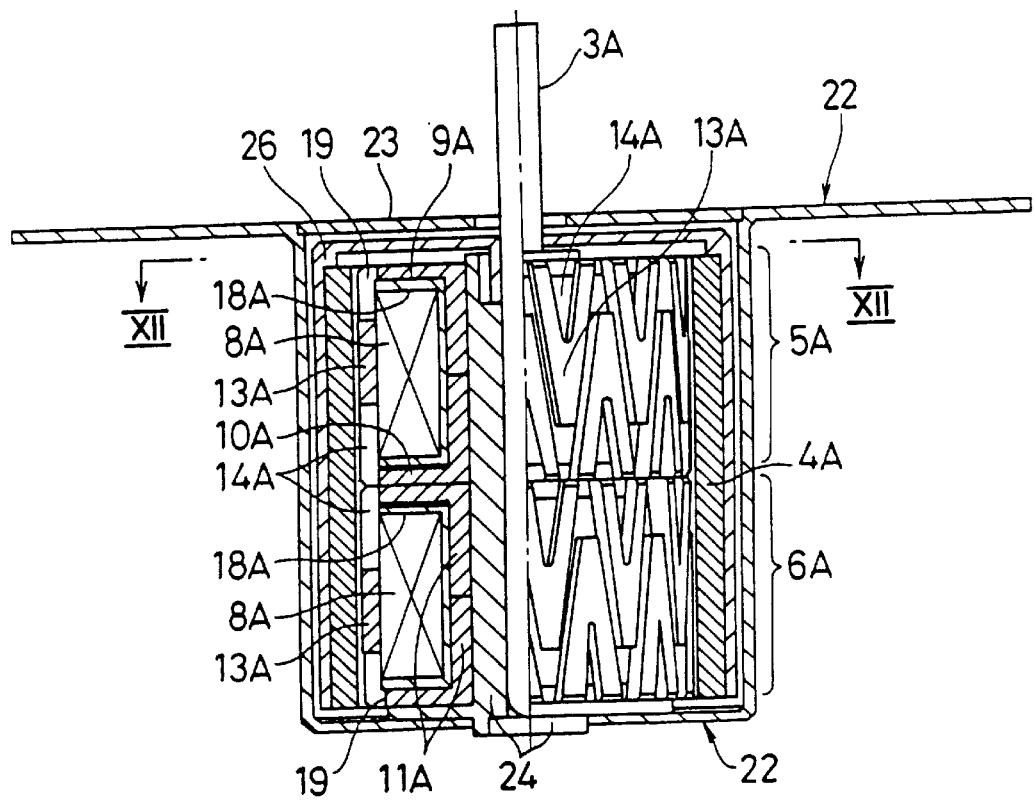
FIG. 13 is a longitudinal cross-sectional view of the second embodiment of the claw pole type synchronous motor according to the present invention.

In FIGS. 12 and 13 is shown a second embodiment of a claw pole type synchronous motor according to the present invention. The motor is of an outer rotor type and comprises two stator assemblies arranged back-to-back, i.e., an A-phase stator assembly 5A and a B-phase stator assembly 6A, like those of the first embodiment. Each stator assembly comprises two stators 9A and 10A.

On the inner edge of each stator is formed a cylindrical side wall 11A which is fitted in a bearing 24 as will be described later. A coil 8A is wound on a bobbin 18A and is placed between the stators 9A and 10A of each stator assembly.

Claw poles 13A are formed on the outer edge 19 of each of the stators 9A and 10A so as to be circumferentially equally spaced from each other and extend toward the outer edge 19 of the opposed stators. The claw poles 13 of the stator assemblies are arranged alternately at equally spaced circumferential intervals as shown in the first embodiment.

Input-current frequency range increasing means (an input-current frequency range increasing portion or portions) 14A comprising a space or spaces is formed in each claw pole 13A as is in the first embodiment. A hollow cylindrical rotor 4A comprises a multi-pole magnetized permanent magnet and coaxially surrounds both stator assemblies 5A and 6A.

A cup-shaped motor housing 22 has a flange on its open end and houses a rotor 4A in which the stator assemblies 5A and 6A are set. A bearing 24 comprises a cylindrical sleeve and extends coaxially into the motor housing 22. The inner end of the bearing 24 is fixed to the bottom of the motor housing 22.

The shaft 3A passes through the central portion of an end plate 23 which closes the open end of the motor housing 22 and extends through the central hole of the bearing 24 so that the outer peripheral surface and the lower end of the shaft 3A are supported by the bearing 24.

The stator assemblies 5A and 6A are securely held in the motor housing 22 by fixing their inner peripheral surfaces to the bearing 24. The rotor 4A surrounding the stator assemblies 5A and 6A is fixed to the shaft 3A so as to be rotatable therewith.

The shapes, the sizes and the functions of the claw poles 13A and the input-current frequency range increasing means 14A of the second embodiment are the same as those of the first embodiment, the detailed description thereof being omitted.

Needless to say, the claw pole type synchronous motor includes a claw pole type stepping motor.

In the claw pole synchronous motor according to the present invention, input-current frequency range increasing means in a form of a space is formed in a portion of each claw pole which has the lowest magnetic flux density. This allows the motor to operate in a frequency range from a low frequency to a higher frequency and at higher torque than those of the prior art and reduces noises generated during operation.

What is claimed is:

1. A claw pole type synchronous motor comprising:
   (1) a shaft;
   (2) a rotor coaxially fixed to said shaft and comprising a multi-pole magnetized permanent magnet;
   (3) two stator assemblies arranged back-to-back and coaxially provided with said rotor, each of said stator assemblies comprising:
      (a) two stators spaced from each other at a distance axially of said shaft, each stator having an annular edge opposed to said shaft, and
      (b) a plurality of claw poles formed on an edge of each of said stators at equal circumferential intervals of each of said stators, each of said claw poles on each one of said stators having a tip portion extending toward the other one of said stators, each of said claw poles on each one of said stators being arranged alternately with said claw poles on the other one of said stators, and each of said claw poles being narrowed toward said respective tip portions thereof;
   (4) coils provided coaxially with said rotor in said stator assemblies and applied with an input-current frequency signal having an input-current frequency; and
   (5) input-current frequency range increasing means formed in a form of at least one space in a portion of each of said claw poles which has the lowest magnetic flux density, for increasing a frequency range of said input-current frequency signal, said space being narrowed toward said tip portions of said claw poles and being formed outside said tip potions of said claw poles.

2. The claw pole type synchronous motor according to claim 1, wherein said input-current frequency range increasing means is provided in a central portion of each of said claw poles.

3. The claw pole type synchronous motor according to claim 1, wherein said input-current frequency range increasing means is formed in each of said claw poles and displaced laterally from a center line thereof.

4. The claw pole type synchronous motor according to claim 1, wherein said input-current frequency range increasing means has a similar shape to a shape of each of said claw poles.

5. The claw pole type synchronous motor according to claim 1, wherein said input-current frequency range increasing means formed in each of said claw poles has an area of 1/10 to 1/2 of an area of each of said claw poles.

6. The claw pole type synchronous motor according to claim 1, wherein said input-current frequency range increasing means comprises a notch formed in each of said claw poles and opening at an edge of each of said stators.

7. The claw pole type synchronous motor according to claim 1, wherein said input-current frequency range increasing means of each of said claw poles comprises a substantially isosceles triangular space.

* * * * *